(12) United States Patent
Kurosaki et al.

(10) Patent No.: US 11,050,293 B2
(45) Date of Patent: Jun. 29, 2021

(54) POWER STORAGE SYSTEM, AND STOP CONTROL SYSTEM

(71) Applicant: Panasonic Intellectual Property Management Co., Ltd., Osaka (JP)

(72) Inventors: Yuta Kurosaki, Osaka (JP); Shintaro Hino, Hyogo (JP); Masahiro Arakawa, Osaka (JP); Katsuaki Hamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 16/601,909

(22) Filed: Oct. 15, 2019

(65) Prior Publication Data

US 2020/0044465 A1    Feb. 6, 2020

Related U.S. Application Data (63) Continuation of application No. PCT/JP2018/015664, filed on Apr. 16, 2018.

(30) Foreign Application Priority Data

May 16, 2017    (JP) .............................. JP2017-097438

(51) Int. Cl.
*H02J 9/06* (2006.01)
*H02J 7/00* (2006.01)
*H02J 9/00* (2006.01)

(52) U.S. Cl.
CPC .............. *H02J 9/06* (2013.01); *H02J 7/0031* (2013.01); *H02J 7/0063* (2013.01); *H02J 9/00* (2013.01); *H02J 2007/0067* (2013.01)

(58) Field of Classification Search
CPC combination set(s) only.
See application file for complete search history.

(56) References Cited

U.S. PATENT DOCUMENTS

| 6,184,656 B1 * | 2/2001 | Karunasiri ............ B60L 3/0046 320/119 |
| 2012/0236451 A1 | 9/2012 | Nakashima et al. |
| 2014/0062416 A1 | 3/2014 | Nakashima et al. |

FOREIGN PATENT DOCUMENTS

WO    2012/050210    4/2012

OTHER PUBLICATIONS

International Search Report of PCT application No. PCT/JP2018/015664 dated Jun. 12, 2018.

* cited by examiner

*Primary Examiner* — Carlos Amaya (74) *Attorney, Agent, or Firm* — McDermott Will & Emery LLP (57) ABSTRACT

A plurality of controlling circuits control a plurality of respective shutdown switches to turn ON/OFF. A first signal system transmits, in a direction from one end of the plurality of controlling circuits to the other end of the plurality of controlling circuits, a significant signal during a normal operation and a non-significant signal when the operation needs to be stopped. The second signal system transmits, in a direction from the other end of the plurality of controlling circuits to the one end of the plurality of controlling circuits, a significant signal during the normal operation and a non-significant signal when the operation needs to be stopped. The other end of the plurality of controlling circuits transmits the non-significant signal through second signal system when a signal received through first signal system is the non-significant signal.

6 Claims, 3 Drawing Sheets

POWER STORAGE SYSTEM, AND STOP CONTROL SYSTEM

TECHNICAL FIELD

The present invention relates to a power storage system including a plurality of power storage units connected in parallel, and to a stop control system.

BACKGROUND ART

Recently, a power storage system has been widespread, and used for a peak shift, a backup, a frequency regulation (FR), and the like. A huge power storage system is constructed by, for example, connecting in parallel a plurality of power storage racks each composed by connecting in series a plurality of power storage modules. The plurality of power storage racks are connected in parallel via respective relays, and each include an independent control system.

The power storage system including a plurality of power storage racks connected in parallel as described above is required to be provided with an emergency stop circuit that can perform hardware control for safe emergency stop when abnormality occurs. Specifically, all the power storage racks are required to be paralleled off immediately in response to an emergency stop signal issued by any of the power storage racks.

Thus, an emergency stop circuit with the following configuration may be contemplated. Specifically, information about storage batteries may be aggregated in a single protection circuit, and the protection circuit may perform hardware control to parallel off each of the plurality of power storage racks connected in parallel (see, for example, PTL 1).

CITATION LIST

Patent Literature

PTL 1: WO 2012/050210 A

SUMMARY OF THE INVENTION

The emergency stop circuit with the configuration described above is limited in terms of expandability by a number of ports of the protection circuit, because each time a power storage rack is added, the power storage rack to be added and the protection circuit need to be connected to each other with wiring newly provided therebetween. Furthermore, the function of the emergency stop circuit as a whole is compromised or impaired when abnormality occurs in the protection circuit.

The present invention has been developed for solving such requirements. It is an object of the present invention to provide a power storage system and a stop control system, including an emergency stop circuit featuring high reliability and expandability.

To solve the above-described problems, a power storage system according to an aspect of the present invention comprises: a plurality of power storage units connected in parallel; a plurality of shutdown switches that control the plurality of respective power storage units to be conductive/nonconductive; a plurality of controlling circuits that control the plurality of respective shutdown switches to turn ON/OFF; a first signal system that establishes connection among the plurality of controlling circuits, and transmits, in a direction from one end of the plurality of controlling circuits to the other end of the plurality of controlling circuits, a significant signal during a normal operation and a non-significant signal when the operation needs to be stopped; and a second signal system that establishes connection among the plurality of controlling circuits, and transmits, in a direction from the other end of the plurality of controlling circuits to the one end of the plurality of controlling circuits, a significant signal during the normal operation and a non-significant signal when the operation needs to be stopped. The other end of the plurality of controlling circuits transmits the non-significant signal through the second signal system when a signal received through the first signal system is the non-significant signal The present invention also includes effective aspects obtained by converting any appropriate combination of the configuration elements described above and expression of the present invention among a method, an apparatus, a system, and the like.

The present invention can achieve the power storage system including an emergency stop circuit with high reliability and expandability, and the stop control system.

DESCRIPTION OF EMBODIMENTS

Figure 1:
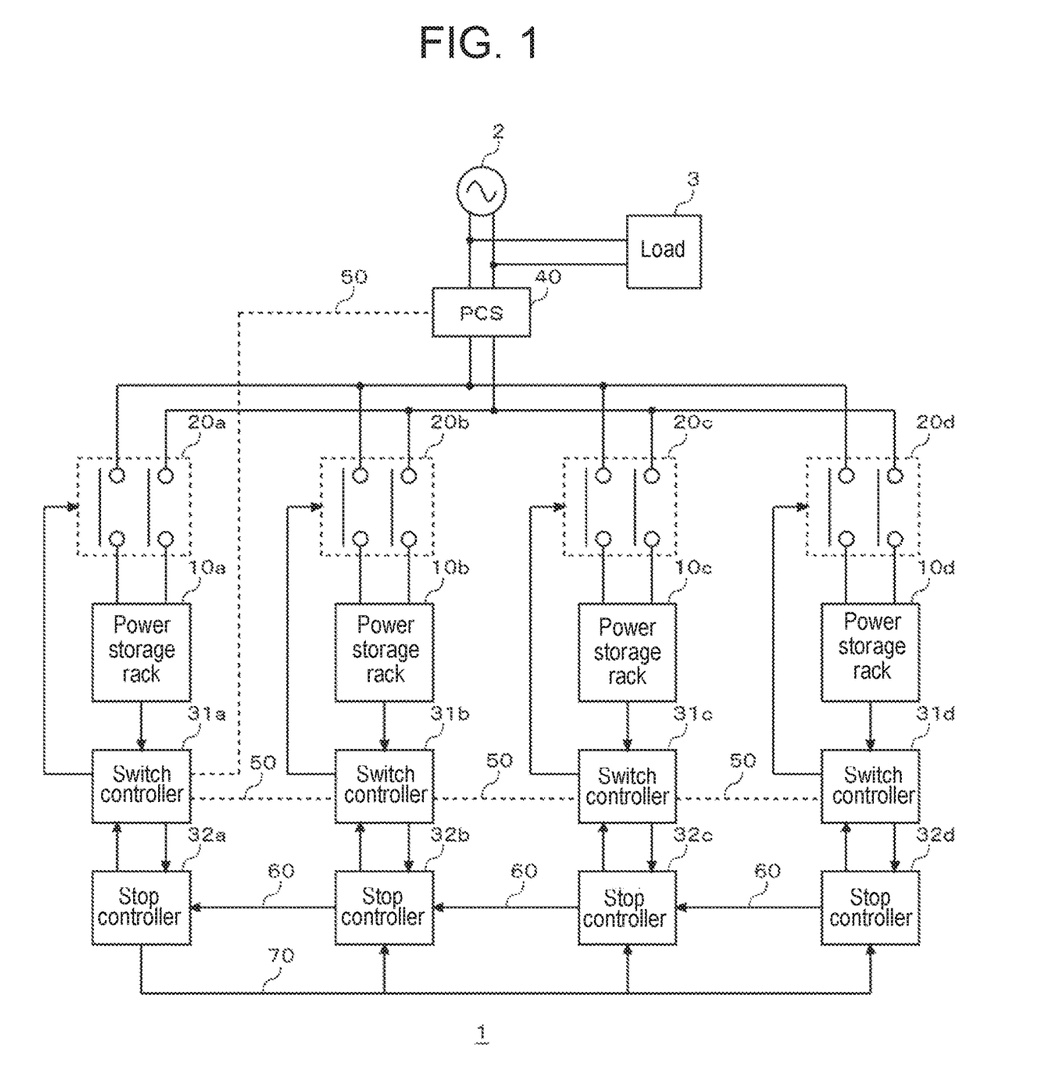
FIG. 1 is a view illustrating a configuration of a power storage system according to an exemplary embodiment of the present invention.

FIG. 1 is a view illustrating a configuration of power storage system 1 according to an exemplary embodiment of the present invention. Power storage system 1 includes a plurality of power storage racks 10a to 10d connected in parallel and power conditioner 40. FIG. 1 illustrates an example where four power storage racks (first power storage rack 10a, second power storage rack 10b, third power storage rack 10c, and fourth power storage rack 10d) are connected in parallel. Power conditioner 40 is connected between the plurality of power storage racks 10a to 10d and a commercial grid (hereinafter, simply referred to as system 2). Load 3 is connected to a distribution line between system 2 and power conditioner 40.

Power conditioner 40 includes a bidirectional inverter, converts DC power discharged from the plurality of power storage racks 10a to 10d into AC power to output it to system 2, and converts AC power input from system 2 into DC power to outputs it to the plurality of power storage racks 10a to 10d. The bidirectional inverter can control charge current/discharge current to/from the plurality of power storage racks 10a to 10d. A bidirectional DC/DC converter may be provided between the bidirectional inverter and each of the plurality of power storage racks 10a to 10d. With such a configuration, the charge current/discharge current can be controlled for each of power storage racks 10a to 10d. A system with voltage different among the plurality of power storage racks 10a to 10d may be established.

First shutdown relay 20a to fourth shutdown relay 20d are inserted between a DC bus, connecting power conditioner 40 and first power storage rack 10a to fourth power storage rack 10d, and first power storage rack 10a to fourth power storage rack 10d, respectively. A semiconductor switch may be used instead of the shutdown relay.

First power storage rack 10a includes a plurality of power storage modules connected in series. Each of the power storage modules includes a plurality of cells connected in series and a managing unit. A lithium ion battery cell, a nickel hydride battery cell, an electric double layer capacitor cell, a lithium ion capacitor cell, or the like can be used for the cells. The managing unit detects voltage, current, and temperature of the plurality of cells, and transmits the detected voltage, current, and temperature to first switch controller 31a. Second power storage rack 10b to fourth power storage rack 10d have the same configuration.

First switch controller 31a to fourth switch controller 31d are each implemented through cooperation between a hardware resource and a software resource. A microcomputer, a digital signal processor (DSP), a field programmable gate array (FPGA), another large scale integration (LSI), or an analog element can be used as the hardware resource. The software resource may be a program such as firmware.

First switch controller 31a detects abnormality of first power storage rack 10a based on the voltage, the current, and the temperature of the cells in first power storage rack 10a received from first power storage rack 10a. For example, first power storage rack 10a is determined to have abnormality, when overcharging, overdischarging, overcurrent, or abnormal temperature is occurring. When abnormality is occurring in first power storage rack 10a, first switch controller 31a issues an abnormality occurrence signal to power conditioner 40 and to other switch controller 31b to fourth switch controller 31d through communication line 50.

Upon receiving the abnormality occurrence signal through communication line 50, power conditioner 40 stops the operation of the bidirectional inverter to stop charging/discharging. When the charging/discharging stops, power conditioner 40 transmits charging/discharging stop signal to first switch controller 31a to fourth switch controller 31d through communication line 50.

Upon receiving the charging/discharging stop signal from power conditioner 40, first switch controller 31a to fourth switch controller 31d respectively control first shutdown relay 20a to fourth shutdown relay 20d to be in an open state, to parallel off first power storage rack 10a to fourth power storage rack 10d. The same applies to cases where switch controllers 31b to 31d other than first switch controller 31a respectively detect abnormality in power storage racks 10b to 10d.

Communications between power conditioner 40 and first switch controller 31a to fourth switch controller 31d may be communications conforming to a communication standard such as Ethernet (registered trademark), Controller Area Network (CAN), or the like.

When one power storage rack 10a is paralleled off as described above, current through other power storage racks 10b to 10d largely fluctuates. Thus, other power storage racks 10b to 10d are preferably also paralleled off. The paralleling off is preferably implemented after the charging/discharging of power conditioner 40 has been stopped.

Unfortunately, the abnormality occurrence signal might fail to be properly transmitted from switch controller 31a that has detected abnormality in power storage rack 10a to power conditioner 40 and other power storage racks 10b to 10d, due to an abnormal operation of a microcomputer in switch controller 31, disconnection of communication line 50, or the like.

In view of this, first stop controller 32a to fourth stop controller 32d are provided in the present exemplary embodiment. First stop controller 32a to fourth stop controller 32d are each implemented using a hardware resource only. Each of switch controllers 31a to 31d and corresponding one of stop controllers 32a to 32d may be mounted on the same substrate or may be mounted on different substrates. In this specification, switch controller 31 and stop controller 32 are collectively referred to as a controlling circuit.

First stop controller 32a to fourth stop controller 32d are connected to each other through two signal path systems. First signal system 60 establishes connection among first stop controller 32a to fourth stop controller 32d employing a daisy chain connection scheme. Fourth stop controller 32d serves as a start point and first stop controller 32a serves as an end point. Thus, a signal is transmitted through fourth stop controller 32d, third stop controller 32c, second stop controller 32b, and first switch controller 31a in this order.

First signal system 60 is controlled to be at a high level during a normal operation, and is controlled to be at a low level when the operation needs to be stopped. Each stop controller 32 transmits a signal, received from previous stop controller 32, to subsequent stop controller 32 with the level unchanged. Thus, when any part of first signal system 60 is disconnected, stop controllers 32 on the downstream side of the part all transmit a low level signal. In first signal system 60, a high level signal is a significant signal, whereas a low level signal is a non-significant signal.

Second signal system 70 establishes connection among first stop controller 32a to fourth stop controller 32d employing a bus connection scheme. First stop controller 32a at the end point in first signal system 60 serves as a master, and second stop controller 32b to fourth stop controller 32d serve as slaves. A signal from first stop controller 32a is transmitted to second stop controller 32b to fourth stop controller 32d with the level unchanged.

Second signal system 70 is controlled be in an energized (=conductive) state during the normal operation, and is controlled to be in a high-impedance state when the operation needs to be stopped. Thus, when any part of second signal system 70 is disconnected, all elements on the downstream side of disconnected part are in the high-impedance state. In second signal system 70, the energized (=conductive) state corresponds to a significant signal and the high-impedance state corresponds to a non-significant signal.

As illustrated in FIG. 1, in first signal system 60, the emergency stop signal is transmitted in a direction from right to left when the disconnection occurs. On the other hand, in second signal system 70, the emergency stop signal is transmitted in a direction from left to right when the disconnection occurs. With this configuration featuring bidirectional transmission of the emergency stop signal, the emergency stop signal can be transmitted to all of stop controllers 32a to 32d even when two stop signal lines between any two stop controllers 32 are both disconnected.

Figure 2:
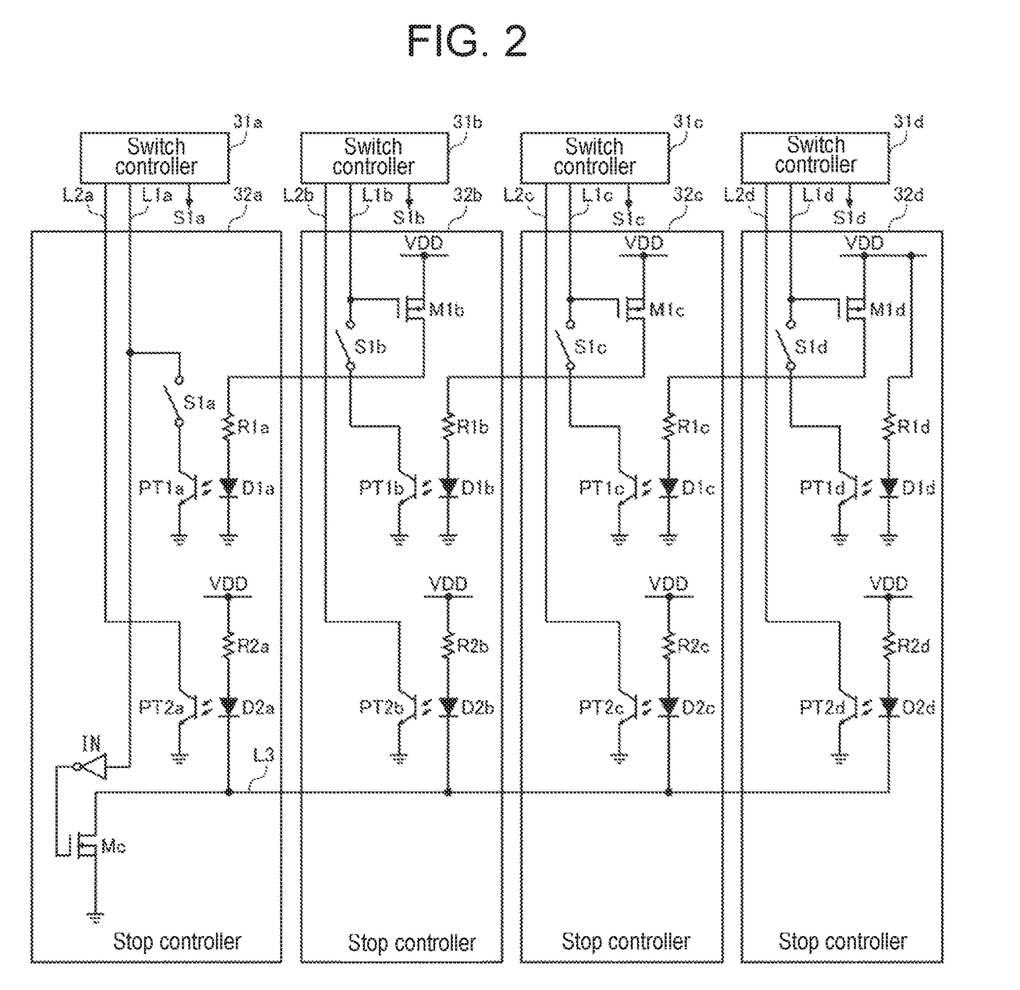
FIG. 2 is a view illustrating an example of configurations of a first stop controller to a fourth stop controller according to a first exemplary embodiment.

FIG. 2 is a view illustrating an example of configurations of first stop controller 32a to fourth stop controller 32d according to a first exemplary embodiment. First of all, configuration elements of first signal system 60 will be described. Fourth stop controller 32d includes P channel field electric transistor (FET) (M1d), switch S1d, resistor R1d, light emitting diode D1d, and phototransistor PT1d. Light emitting diode D1d and phototransistor PT1d form a single photocoupler. Third stop controller 32c includes resistor R1c, light emitting diode D1c, and phototransistor PT1c. Light emitting diode D1c and phototransistor PT1c form a single photocoupler.

P channel FET (M1d) has a source terminal connected to power source electric potential VDD (5 V for example) and has a drain terminal connected to an anode terminal of light emitting diode D1c via resistor R1c. P channel FET (M1d) has a gate terminal connected to first control signal line L1d of fourth switch controller 31d. Light emitting diode D1c has a cathode terminal connected to a ground electric potential. Phototransistor PT1c is of an NPN type, has an emitter terminal connected to the ground electric potential, has a collector terminal connected to first control signal line L1c of third switch controller 31c, and becomes conductive when a base part is irradiated with light. The ground electric potentials of first stop controller 32a to fourth stop controller 32d are connected to each other through ground lines (not illustrated).

Although not elaborated in the figure, first control signal line L1d of fourth switch controller 31d is pulled up to high level electric potential (5 V for example). Switch S1d inserted to first control signal line L1d is controlled to be in an ON state, during the normal operation. Light emitting diode D1d is constantly in ON state and phototransistor PT1d is constantly in a conductive state. Thus, electric potential of first control signal line L1d of fourth switch controller 31d is controlled to be at a low level during the normal operation.

As a result, P channel FET (M1d) is in an ON state, and light emitting diode D1c of third stop controller 32c is in an ON state.

Fourth switch controller 31d turns OFF switch S1d when emergency stop of first power storage rack 10a to fourth power storage rack 10d, connected in parallel, is required. Thus, the electric potential of first control signal line L1d rises to a high level. As a result, P channel FET (M1d) turns OFF and light emitting diode D1c of third stop controller 32c turns OFF.

When light emitting diode D1c turns OFF, phototransistor PT1c turns OFF. Stopping current to light emitting diode D1c corresponds to transmission of the emergency stop signal. Tuning OFF light emitting diode D1c and turning OFF phototransistor PT1c correspond to reception of the emergency stop signal.

Upon detecting abnormality in fourth power storage rack 10d, fourth switch controller 31d first transmits the abnormality occurrence signal to power conditioner 40 and other first switch controller 31a to third switch controller 31c through communication line 50. Fourth switch controller 31d turns OFF switch S1d when a predetermined period of time elapses after transmitting the abnormality occurrence signal, without receiving the charging/discharging stop signal from power conditioner 40.

When a plurality of levels of abnormality determination thresholds are set for each of voltage, current, and temperature of fourth power storage rack 10d, fourth switch controller 31d turns OFF switch S1d in response to the voltage, current, or temperature of fourth power storage rack 10d exceeding the threshold at the highest level. Any of the parameters exceeding the threshold corresponds to necessity of emergency stop of first power storage rack 10a to fourth power storage rack 10d Third stop controller 32c includes P channel FET (M1c) and switch S1c. Second stop controller 32b includes resistor R1b, light emitting diode D1b, and phototransistor PT1b. Light emitting diode D1b and phototransistor PT1b form a single photocoupler. P channel FET (M1c) has a gate terminal connected to first control signal line L1c of third switch controller 31c.

Although not elaborated in the figure, first control signal line L1c of third switch controller 31c is pulled up to high level electric potential. Switch S1c inserted to first control signal line L1c is controlled to be in an ON state, during the normal operation. When phototransistor PT1c is in a conductive state, the electric potential of first control signal line L1c of third switch controller 31c is controlled to be at a low level, and thus P channel FET (M1c) is in the ON state. In this state, light emitting diode D1b of second stop controller 32b is in the ON state.

As described above, when phototransistor PT1c of third stop controller 32c is turned OFF, the electric potential of first control signal line L1c of third switch controller 31c rises to a high level. With this electric potential rise, third switch controller 31c recognizes the emergency stop signal from the upstream side. The electric potential rise of first control signal line L1c results in P channel FET (M1c) turning OFF and light emitting diode D1b of second stop controller 32b turning OFF.

Third switch controller 31c turns OFF switch S1c when emergency stop of first power storage rack 10a to fourth power storage rack 10d, connected in parallel, is required. Thus, the electric potential of first control signal line L1c rises to a high level. As a result, P channel FET (M1c) turns OFF and light emitting diode D1b of second stop controller 32b turns OFF.

Second stop controller 32b includes P channel FET (M1b) and switch S1b. First stop controller 32a includes switch S1a, resistor R1a, light emitting diode D1a, and phototransistor PT1a. Light emitting diode D1a and phototransistor PT1a form a single photocoupler. P channel FET (M1b) has a gate terminal connected to first control signal line L1b of second switch controller 31b.

Although not elaborated in the figure, first control signal line L1b of second switch controller 31b is pulled up to high level electric potential. Switch S1b inserted to first control signal line L1b is controlled to be in an ON state, during the normal operation. When phototransistor PT1b is in a conductive state, the electric potential of first control signal line L1b of second switch controller 31b is controlled to be at a low level, and thus P channel FET (M1b) is in the ON state. In this state, light emitting diode D1a of first stop controller 32a is in the ON state.

As described above, when phototransistor PT1b of second stop controller 32b is turned OFF, the electric potential of first control signal line L1b of second switch controller 31b rises to a high level. With this electric potential rise, second switch controller 31b recognizes the emergency stop signal from the upstream side. The electric potential rise of first control signal line L1b results in P channel FET (M1b) turning OFF and light emitting diode D1a of first stop controller 32a turning OFF.

Second switch controller 31b turns OFF switch S1b when emergency stop of first power storage rack 10a to fourth power storage rack 10d, connected in parallel, is required. Thus, the electric potential of first control signal line L1b rises to a high level. As a result, P channel FET (M1b) turns OFF and light emitting diode D1a of first stop controller 32a turns OFF.

Phototransistor PT1a of first stop controller 32a has a collector terminal connected to first control signal line L1a of first switch controller 31a via switch S1a. Switch S1a is controlled to be in the ON state during the normal operation. When light emitting diode D1a of first stop controller 32a is turned OFF and phototransistor PT1a is turned OFF, the electric potential of first control signal line L1a of first switch controller 31a rises to a high level. With this electric potential rise, first switch controller 31a recognizes the emergency stop signal from the upstream side.

Next, configuration elements of second signal system 70 will be described. First stop controller 32a includes N channel FET (Mc), resistor R2a, light emitting diode D2a, and phototransistor PT2a. Second stop controller 32b includes resistor R2b, light emitting diode D2b, and phototransistor PT2b. Third stop controller 32c includes resistor R2c, light emitting diode D2c, and phototransistor PT2c. Fourth stop controller 32d includes resistor R2d, light emitting diode D2d, and phototransistor PT2d. Each pair of light emitting diode D2 and phototransistor PT2 forms a single photocoupler.

N channel FET (Mc) of first stop controller 32a has a source terminal connected to the ground electric potential, a drain terminal connected to common signal line L3, and a gate terminal connected to first control signal line L1a of first switch controller 31a via inverter IN.

Light emitting diode D2a of first stop controller 32a has an anode terminal connected to power source electric potential VDD via resistor R2a and a cathode terminal connected to common signal line L3. Phototransistor PT2a is of an NPN type, has an emitter terminal connected to the ground electric potential, has a collector terminal connected to second control signal line L2a of first switch controller 31a, and becomes conductive when a base part is irradiated with light.

Light emitting diode D2b of second stop controller 32b has an anode terminal connected to power source electric potential VDD via resistor R2b and a cathode terminal connected to common signal line L3. Phototransistor PT2b is of an NPN type, has an emitter terminal connected to the ground electric potential, has a collector terminal connected to second control signal line L2b of second switch controller 31b, and becomes conductive when a base part is irradiated with light. Resistor R2c, light emitting diode D2c, and phototransistor PT2c in third stop controller 32c, and resistor R2d, light emitting diode D2d, and phototransistor PT2d in fourth stop controller 32d have configurations that are similar to those of resistor R2b, light emitting diode D2b, and phototransistor PT2b in second stop controller 32b.

The electric potential of second control signal lines L2a to L2d is controlled to be at a low level during the normal operation. First switch controller 31a to fourth switch controller 31d recognize the emergency stop signal in response to second control signal lines L2a to L2d being in the high-impedance state.

When abnormality is occurring in none of first power storage rack 10a to fourth power storage rack 10d while power storage system 1 is operating, phototransistor PT1a of first switch controller 31a is conductive and the electric potential of first control signal line L1a is controlled to be at a low level. Inverter IN applies high level electric potential to the gate terminal of N channel FET (Mc) to control N channel FET (Mc) to be in the ON state. In this state, light emitting diodes D2a to D2d are all ON, phototransistors PT2a to PT2d are all conductive, and the electric potential of all second control signal lines L2a to L2d is controlled to be at a low level.

When any one of second switch controller 31b to fourth switch controller 31d transmits the emergency stop signal, light emitting diode D1a of first stop controller 32a is turned OFF, phototransistor PT1a is turned OFF, and the electric potential of first control signal line L1a rises to a high level. In response to the electric potential rise, inverter IN applies low level electric potential to the gate terminal of N channel FET (Mc), and N channel FET (Mc) turns OFF. As a result, light emitting diodes D2a to D2d are all turned OFF, phototransistors PT2a to PT2d are all turned OFF, and the electric potential of all second control signal lines L2a to L2d rises to a high level. Thus, first switch controller 31a to fourth switch controller 31d recognize the emergency stop signal.

First switch controller 31a turns OFF switch S1a when emergency stop of first power storage rack 10a to fourth power storage rack 10d, connected in parallel, is required. Thus, the electric potential of first control signal line L1a rises to a high level. In response to the electric potential rise, inverter IN applies low level electric potential to the gate terminal of N channel FET (Mc), and the electric potential of all of second control signal lines L2a to L2d rises to a high level, as in the case described above. Thus, first switch controller 31a to fourth switch controller 31d recognize the emergency stop signal.

According to the first exemplary embodiment described above, when switch controller 31 of any of power storage racks 10 transmits the emergency stop signal, power storage racks 10a to 10d can all similarly be controlled to be in a parallel-off state. Power storage racks 10a to 10d can all be similarly controlled to be in a parallel-off state, also when any wiring among stop controllers 32a to 32d forming the emergency stop circuit is disconnected. Thus, a plurality of power storage racks 10a to 10d that are connected in parallel and each include an independent control system can transition to the parallel-off state for emergency stop in a coordinated manner.

A power storage rack can be added simply by connecting this power storage rack to be added and fourth power storage rack 10d via wiring of first signal system 60 and second signal system 70, whereby expansion can be achieved with easy setting. A further power storage rack can be easily added. On the other hand, a configuration in which a plurality of power storage racks connected in parallel are collectively protected with a single protection circuit is difficult to expand once all the ports of the protection circuit are occupied.

First stop controller 32a to fourth stop controller 32d are each implemented using a hardware resource, and thus feature high reliability. Thus, with the first exemplary embodiment, an emergency stop circuit with high reliability and expandability can be established.

With first stop controller 32a to fourth stop controller 32d connected to each other using two wiring systems in the different signal transmission directions, stop controllers 32a to 32d can all share a signal even when disconnection occurs at any part of the systems. First signal system 60 employs a daisy chain connection scheme and second signal system 70 employs a bus connection scheme. Thus, a number of elements can be reduced from a configuration in which both two systems employ a daisy chain connection scheme. The daisy chain connection scheme requires each stop controller 32 to have transmission and reception functions, whereas the bus connection scheme only requires first stop controller 32a set to be the master to have the transmission function and second stop controller 32b to fourth stop controller 32d set to be the slaves to have the reception function only.

Figure 3:
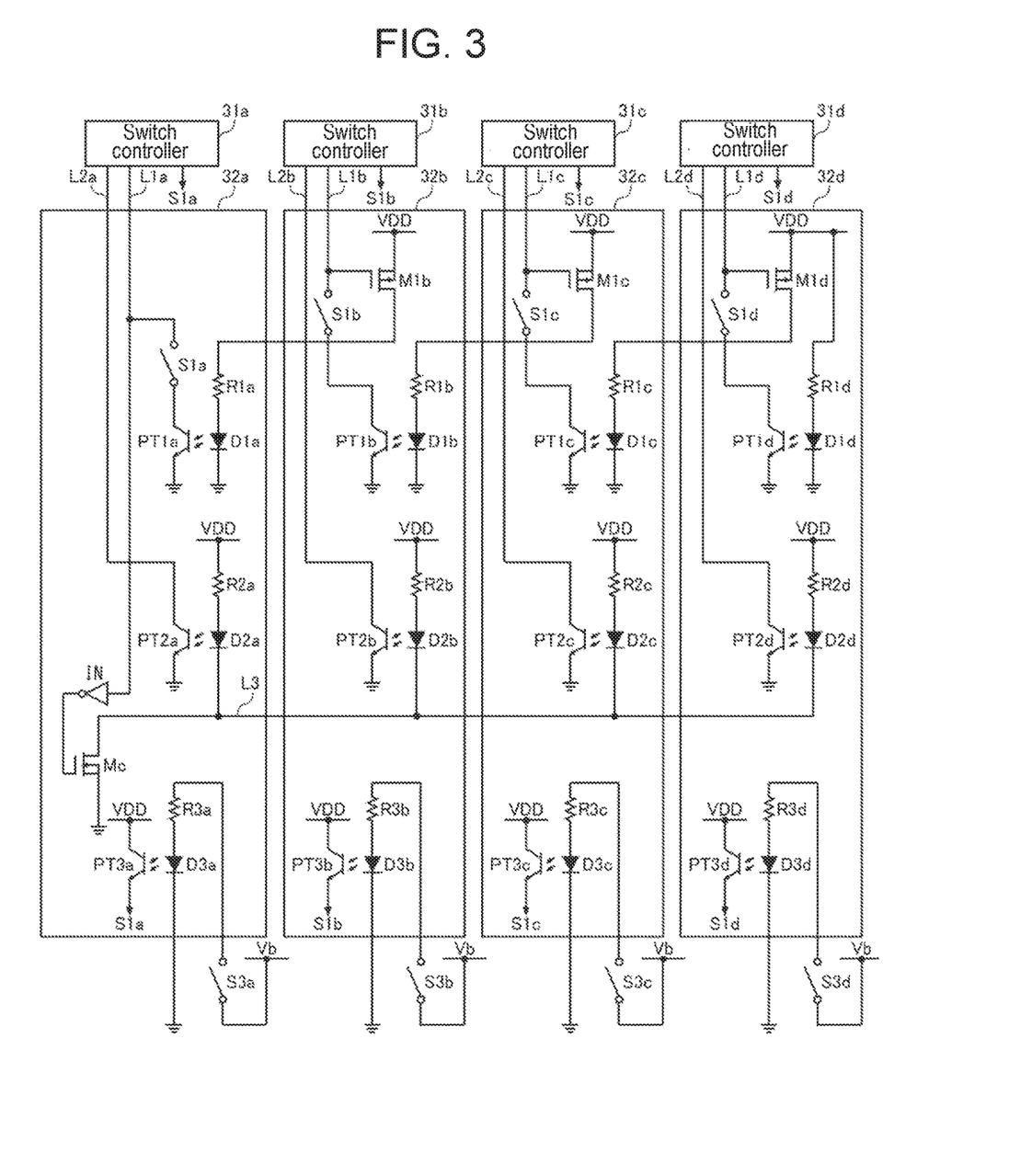
FIG. 3 is a view illustrating an example of configurations of a first stop controller to a fourth stop controller according to a second exemplary embodiment.

FIG. 3 is a view illustrating an example of configurations of first stop controller 32a to fourth stop controller 32d according to a second exemplary embodiment. The configuration according to the second exemplary embodiment illustrated in FIG. 3 is obtained by adding a function of causing emergency stop of first power storage rack 10a to fourth power storage rack 10d from outside to the configuration according to the first exemplary embodiment illustrated in FIG. 2. For example, a description is given on an example where first power storage rack 10a to fourth power storage rack 10d are each accommodated in a cabinet, and the cabinets are each sealed and cooled. When ambient temperature is high, the temperature in the cabinet sharply rises as soon as the cabinet is opened. In view of this, emergency stop of first power storage rack 10a to fourth power storage rack 10d may be triggered by opening of the cabinet. Furthermore, an operation button may be provided outside the cabinet to enable the user to cause the emergency stop of first power storage rack 10a to fourth power storage rack 10d.

First stop controller 32a further includes resistor R3a, light emitting diode D3a, and phototransistor PT3a. Second stop controller 32b includes resistor R3b, light emitting diode D3b, and phototransistor PT3b. Third stop controller 32c further includes resistor R3c, light emitting diode D3c, and phototransistor PT3c. Fourth stop controller 32d further includes resistor R3d, light emitting diode D3d, and phototransistor PT3d. Each pair of light emitting diode D3 and phototransistor PT3 forms a single photocoupler.

Light emitting diode D3a of first stop controller 32a has an anode terminal connected to one end of external switch S3a via resistor R3a and a cathode terminal connected to the ground electric potential. External switch S3a has the other end connected to control power source electric potential Vb (24 V for example). Phototransistor PT3a is of an NPN type, has an emitter terminal connected to power source electric potential VDD, has a collector terminal connected to a control terminal of switch S1a, and becomes conductive when a base part is irradiated with light.

External switch S3a is controlled to turn ON/OFF using a door of the cabinet or using the operation button. External switch S3a is controlled to be in an ON state when the door of the cabinet is closed, and to be in an OFF state when the door is open. Furthermore, external switch S3a is controlled to be in the ON state when the operation button is in an OFF state, and to be in the OFF state when the operation button is in an ON state.

An ON signal is transmitted to the control terminal of switch S1a when phototransistor PT3a is in a conductive state, and an OFF signal is transmitted to the control terminal of switch S1a when phototransistor PT3a is in a nonconductive state. Switch S1a is turned OFF upon receiving the OFF signal from at least one of phototransistor PT3a and first switch controller 31a.

When switch S1a turns OFF as described above, the electric potential of first control signal line L1a rises to a high level. In response to the electric potential rise, inverter IN applies low level electric potential to the gate terminal of N channel FET (Mc), and the electric potential of all of second control signal lines L2a to L2d rises to a high level. Thus, first switch controller 31a to fourth switch controller 31d recognize the emergency stop signal.

Resistor R3b, light emitting diode D3b, and phototransistor PT3b in second stop controller 32b, resistor R3c, light emitting diode D3c, and phototransistor PT3c in third stop controller 32c, and resistor R3d, light emitting diode D3d, and phototransistor PT3d in fourth stop controller 32d have configurations that are similar to those of resistor R3a, light emitting diode D3a, and phototransistor PT3a in first stop controller 32a. Thus, transitioning of any one of external switches S3b to S3d to the OFF state causes emergency stop of first power storage rack 10a to fourth power storage rack 10d.

With the second exemplary embodiment as described above, effects similar to those in the first exemplary embodiment can be obtained, and the emergency stop of first power storage rack 10a to fourth power storage rack 10d can be triggered by hardware control based on a change in an external environment or based on a user operation.

The present invention has been described with reference to the exemplary embodiments. Those skilled in the art will comprehend that the exemplary embodiments are merely exemplified, the configuration elements and the processing processes have various modification examples in terms of combination, and such modification examples are included in the scope of the present invention.

In the circuit configurations illustrated in FIGS. 2 and 3 described above, resistor R1d, light emitting diode D1d, and phototransistor PT1d of fourth stop controller 32d correspond to a dummy circuit for expansion, and thus are not essential configuration elements. The other end of switch S1d may be directly connected to the ground electric potential.

In the exemplary configurations described above in the first and the second exemplary embodiments, first signal system 60 employs a daisy chain connection scheme and second signal system 70 employs a bus connection scheme. Alternatively, both first signal system 60 and second signal system 70 may employ a daisy chain connection scheme.

The stop control system implemented with switch controllers 31a to 31d and stop controllers 32a to 32d described above is applicable to loads other than power storage racks 10a to 10d, as long as the loads operate in parallel. For example, a charge/discharge test apparatus includes a plurality of DC/DC converters, for charging/discharging a sample, connected in parallel with an inverter. The stop control system is usable as a protection circuit for implementing emergency stop of the plurality of DC/DC converters.

The exemplary embodiments may be specified by the following items.

[Item 1]

Power storage system (1) comprising:

a plurality of power storage units (10a to 10d) connected in parallel;

a plurality of shutdown switches (20a to 20d) that control the plurality of respective power storage units (10a to 10d) to be conductive/nonconductive;

a plurality of controlling circuits (31a to 31d, 32a to 32d) that control the plurality of respective shutdown switches (20a to 20d) to turn ON/OFF;

first signal system (60) that establishes connection among the plurality of controlling circuits (31a to 31d, 32a to 32d), and transmits, in a direction from one end (31d, 32d) of the plurality of controlling circuits (31a to 31d, 32a to 32d) to the other end (31a, 32a) of the plurality of controlling circuits, a significant signal during a normal operation and a non-significant signal when the operation needs to be stopped; and second signal system (70) that establishes connection among the plurality of controlling circuits (31a to 31d, 32a to 32d), and transmits, in a direction from the other end (31a, 32a) of the plurality of controlling circuits (31a to 31d, 32a to 32d) to the one end (31d, 32d) of the plurality of controlling circuits, a significant signal during the normal operation and a non-significant signal when the operation needs to be stopped, wherein the other end (31a, 32a) of the plurality of controlling circuits transmits the non-significant signal through second signal system (70) when a signal received through first signal system (60) is the non-significant signal.

With this configuration, power storage system (1) including an emergency stop circuit with high reliability and expandability can be established.

Power storage system (1) according to Item 1, wherein first signal system (60) establishes the connection among the plurality of controlling circuits (31a to 31d, 32a to 32d) employing a daisy chain connection scheme, second signal system (70) establishes the connection among the plurality of controlling circuits (31a to 31d, 32a to 32d) employing a bus connection scheme, and the other end (31a, 32a) of the plurality of controlling circuits that is an end point of the daisy chain controls the bus of second signal system (70) to be in a high-impedance state when a signal received through first signal system (60) is the non-significant signal.

With this configuration, the number of elements can be reduced compared with a configuration where both first signal system (60) and second signal system (70) employ a daisy chain connection scheme.

[Item 3]

Power storage system (1) according to Item 2, wherein first signal system (60) includes wiring through which current flows from a first fixed electric potential (VDD) of a controlling circuit that is one of adjacent two of the controlling circuits on side of the one end to a second fixed electric potential (GND) of a controlling circuit that is one of the adjacent two of the controlling circuits on side of the other end, control switch (M1) that is interposed in the wiring in the controlling circuit on the side of the one end, and detection circuit (D1, PT1) that detects a conductive state of the wiring in the controlling circuit on the side of the other end, and when detection circuit (D1, PT1) detects a nonconductive state of the wiring, the controlling circuit on the side of the other end turns OFF a control target among shutdown switches (20).

With this configuration, when disconnection or element failure occurs on the upstream side, shutdown switch (20) is turned OFF, so that power storage system (1) can automatically stop.

[Item 4]

Power storage system (1) according to Item 3, wherein the controlling circuit on the side of the one end turns OFF control switch (M1) when a charging/discharging operation for the plurality of power storage units (10a to 10d) connected in parallel needs to be stopped.

With this configuration, the plurality of power storage units (10a to 10d) can be paralleled off without using communication line (50).

[Item 5]

Power storage system (1) according to Item 3 or 4, wherein control switch (M1) is capable of being turned OFF by an external signal generated due to a user operation or a change in an external environment.

With this configuration, the plurality of power storage units (10a to 10d) can be paralleled off from outside.

[Item 6]

A stop control system that controls a plurality of shutdown switches (20a to 20d) that control a plurality of respective loads (10a to 10d), connected in parallel, to be conductive/nonconductive, the stop control system comprising:

a plurality of controlling circuits (31a to 31d, 32a to 32d) that control the plurality of respective shutdown switches (20a to 20d) to turn ON/OFF;

first signal system (60) that establishes connection among the plurality of controlling circuits (31a to 31d, 32a to 32d), and transmits, in a direction from one end (31d, 32d) of the plurality of controlling circuits (31a to 31d, 32a to 32d) to the other end (31a, 32a) of the plurality of controlling circuits, a significant signal during a normal operation and a non-significant signal when the operation needs to be stopped; and second signal system (70) that establishes connection among the plurality of controlling circuits (31a to 31d, 32a to 32d), and transmits, in a direction from the other end (31a, 32a) of the plurality of controlling circuits (31a to 31d, 32a to 32d) to the one end (31d, 32d) of the plurality of controlling circuits, a significant signal during the normal operation and a non-significant signal when the operation needs to be stopped, wherein the other end (31a, 32a) of the plurality of controlling circuits transmits the significant signal through the second signal system when a signal received through first signal system (60) is the significant signal.

With this configuration, an emergency stop system with high reliability and expandability can be established.

The invention claimed is:

1. A power storage system comprising:
a plurality of power storage units connected in parallel;
a plurality of shutdown switches that control the plurality of respective power storage units to be conductive or nonconductive;
a plurality of controlling circuits that control the plurality of respective shutdown switches to turn ON or OFF;
a first signal system that establishes connection among the plurality of controlling circuits, and transmits, in a direction from one end of the plurality of controlling circuits to the other end of the plurality of controlling circuits, a significant signal during a normal operation and a non-significant signal when the operation needs to be stopped; and
a second signal system that establishes connection among the plurality of controlling circuits, and transmits, in a direction from the other end of the plurality of controlling circuits to the one end of the plurality of controlling circuits, a significant signal during the normal operation and a non-significant signal when the operation needs to be stopped,
wherein the other end of the plurality of controlling circuits transmits the non-significant signal through the second signal system when a signal received through the first signal system is the non-significant signal.

2. The power storage system according to claim 1, wherein
the first signal system establishes the connection among the plurality of controlling circuits employing a daisy chain connection scheme,
the second signal system establishes the connection among the plurality of controlling circuits employing a bus connection scheme, and
the one of the plurality of controlling circuits on the other end that is an end point of the daisy chain controls the bus of the second signal system to be in a high-impedance state when a signal received through the first signal system is the non-significant signal.

3. The power storage system according to claim 2, wherein
the first signal system includes wiring through which current flows from a first fixed electric potential of a controlling circuit that is one of adjacent two of the controlling circuits on side of the one end to a second fixed electric potential of a controlling circuit that is one of the adjacent two of the controlling circuits on side of the other end, a control switch that is interposed in the wiring in the controlling circuit on the side of the one end, and a detection circuit that detects a conductive state of the wiring in the controlling circuit on the side of the other end, and when the detection circuit detects a nonconductive state of the wiring, the controlling circuit on the side of the other end turns OFF a control target among the shutdown switches.

4. The power storage system according to claim 3, wherein the controlling circuit on the side of the one end turns OFF the control switch when a charging or discharging operation for the plurality of power storage units connected in parallel needs to be stopped.

5. The power storage system according to claim 3, wherein the control switch is capable of being turned OFF by an external signal generated due to a user operation or a change in an external environment.

6. A stop control system that controls a plurality of shutdown switches that control a plurality of respective loads, connected in parallel, to be conductive or nonconductive, the stop control system comprising:

a plurality of controlling circuits that control the plurality of respective shutdown switches to turn ON or OFF;

a first signal system that establishes connection among the plurality of controlling circuits, and transmits, in a direction from one end of the plurality of controlling circuits to the other end of the plurality of controlling circuits, a significant signal during a normal operation and a non-significant signal when the operation needs to be stopped; and a second signal system that establishes connection among the plurality of controlling circuits, and transmits, in a direction from the other end of the plurality of controlling circuits to the one end of the plurality of controlling circuits, a significant signal during the normal operation and a non-significant signal when the operation needs to be stopped, wherein the other end of the plurality of controlling circuits transmits the non-significant signal through the second signal system when a signal received through the first signal system is the non-significant signal.

* * * * *